Figure 1:
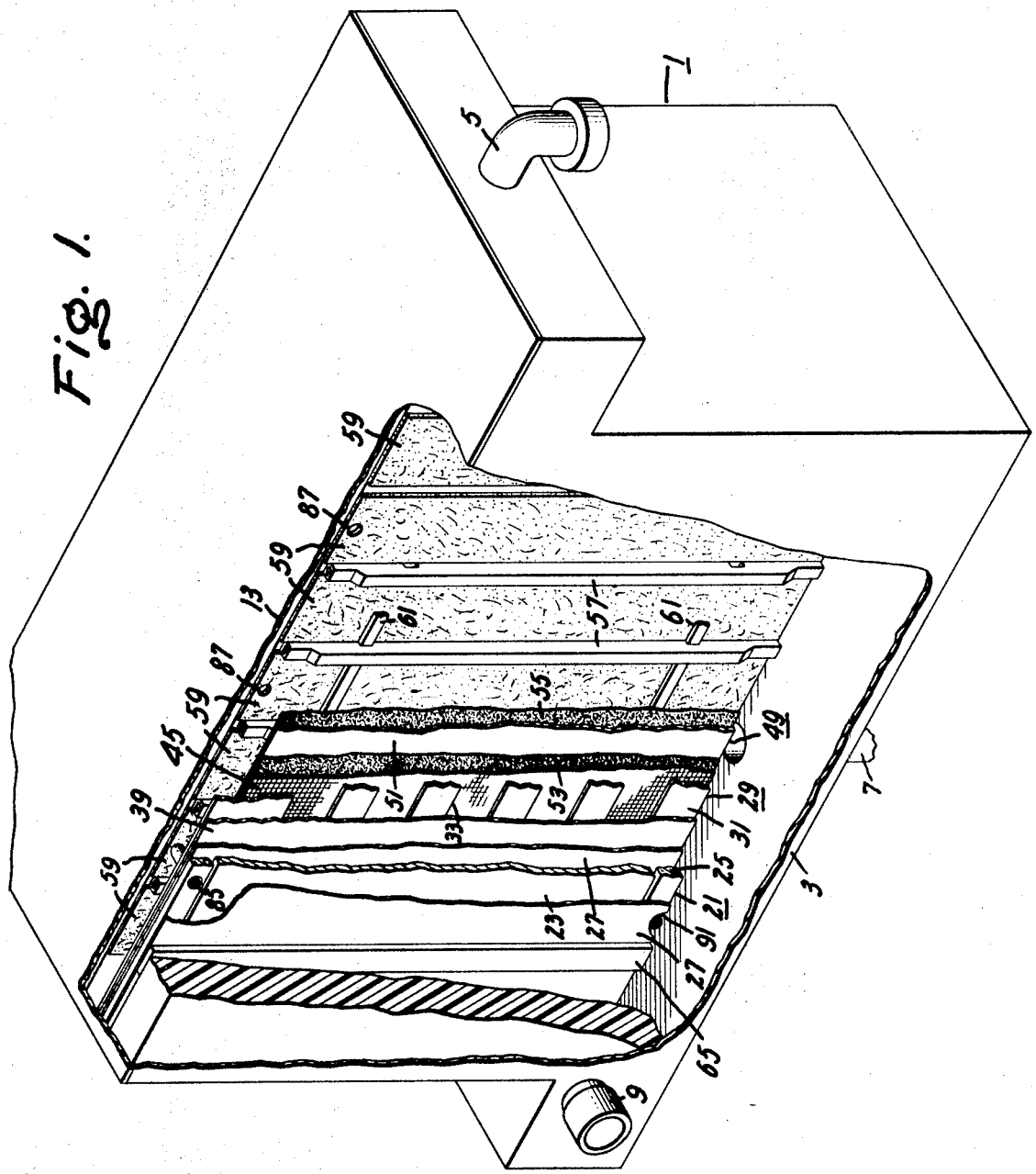

United States Patent

[11] 3,607,425

[72] Inventors William A. Titterington
Lynnfield;
John P. Gallagher, Wilmington; Robert W. Milgate, Jr., Marblehead, all of Mass.
[21] Appl. No. 621,114
[22] Filed Mar. 2, 1967
[45] Patented Sept. 21, 1971
[73] Assignee General Electric Company

[54] FUEL BATTERY INCLUDING APPARATUS INNOVATIONS RELATING TO HEAT TRANSFER, REACTANT DISTRIBUTION, AND ELECTRICAL OUTPUT
6 Claims, 4 Drawing Figs.

[52] U.S. Cl. .................................................. 136/86
[51] Int. Cl. .............................................. H01m 27/00
[50] Field of Search ........................................ 136/86

[56] References Cited
UNITED STATES PATENTS
3,134,696  5/1964  Douglas et al. ............... 136/86
3,256,116  6/1966  Justi et al. ...................... 136/86
3,270,802  9/1966  Lindberg ...................... 136/86 UX
3,356,535  12/1967  Drushella ...................... 136/86
3,372,060  3/1968  Platner ......................... 136/86
3,392,058  7/1968  Harrison et al. ............... 136/86
3,395,047  7/1968  Terry et al. .................... 136/86

FOREIGN PATENTS
995,557  6/1965  Great Britain ................. 136/86
1,412,619  8/1965  France ......................... 136/86

Primary Examiner—Allen B. Curtis
Assistant Examiner—M. J. Andrews
Attorneys—Nathan J. Cornfield, Carl O. Thomas, Frank L. Neuhauser, Oscar B. Waddell and Melvin M. Goldenberg ABSTRACT: An internally tapped fuel battery which serially feeds a first group of cells between one terminal and an internal tap and a second group of cells between the internal tap and a second terminal. In addition, the external wall of the battery includes a deformable thermally conductive member to facilitate heat transfer from the battery.

Inventors:
William A. Titterington,
John P. Gallagher,
Robert W. Milgate, Jr.
by Carl O. Thomas
Their Attorney.

Inventors:
William A. Titterington,
John P. Gallagher,
Robert W. Milgate, Jr.
by Carl O. Thomas
Their Attorney.

FUEL BATTERY INCLUDING APPARATUS INNOVATIONS RELATING TO HEAT TRANSFER, REACTANT DISTRIBUTION, AND ELECTRICAL OUTPUT

Our invention relates to a novel fuel battery comprised of a structural combination of elements producing improvements relating to heat transfer, distribution of reactants, and electrical output.

The fuel cell, an invention of Sir William Grove in the 1830's, is by now well understood. In essence, a fuel cell is comprised of space electrodes communicated ionically by an electrolyte. One of the electrodes is capable of electrocatalytically reducing an externally supplied fluid oxidant, while the remaining electrode is capable of electrocatalytically oxidizing an externally supplied fluid fuel. Electricity is generated by the transfer of electrons liberated by oxidation at the fuel electrode through an external circuit for utilization in reduction of the oxidant.

One should not be misled by the conceptual simplicity of fuel cells into assuming that the construction of a unit for generating electrical power comprised of a multiplicity of fuel cells—i.e. a fuel battery—intended to operate reliably at high efficiencies unattended over prolonged periods under variable weather conditions can be easily accomplished. In considering a fuel battery of the specified characteristics, account must be taken of a number of interrelated parameters that influence fuel cell performance.

One particularly troublesome area in building successful fuel batteries has been the matter of obtaining a desirable moisture balance within the battery. Both fuel and oxidant are usually continuously fed to an operating fuel battery in amounts exceeding consumption requirements, the unreacted excess being continuously exhausted. Alternately, a fuel battery may be operated dead ended—i.e., with all the reactants supplied unattended over therein. In such case, of course, it will be necessary to periodically purge the battery, to prevent the accumulation of inerts. In either instance, both the reactants fed in and the gas exhausted or purged will carry with it a quantity of moisture, At the same time, if hydrogen or a hydrocarbon is employed as a fuel and air, oxygen, hydrogen peroxide, etc., is supplied as an oxidant, water will be formed within the cell as a reaction product. If the rate at which water is carried into or formed within the fuel battery exceeds the rate at which it can be removed, the electrical power output of the cells will be adversely affected, due to the moisture masking the electrodes from the reactants—a condition termed "drowning." If, on the other hand, moisture is, on balance, removed from the fuel battery, the internal resistance of the electrolyte will be adversely affected, particularly where an ion exchange membrane or immobilized electrolyte is employed. If the fuel battery is supplying an electrical load requiring a fixed current output, an increase in internal resistance will produce increased heating within the fuel battery, which will in turn function to accelerate moisture loss by increasing the moisture-carrying capacity of the gaseous reactants. Left unchecked, failure of the unit through overheating will result. While it is no simple matter to arrange the elements of the fuel battery for balanced moisture removal at any given set of conditions, it also must be borne in mind that the moisture content and carrying capacity of the reactants may vary widely, even in a single application, particularly where air is employed as an oxidant and the fuel battery is exposed to climatic temperature fluctuations.

Intimately associated with the moisture balance are heat transfer considerations. In operation, a fuel battery will generate heat as well as electricity, the amount depending upon the current drain rate as well as the moisture content of the electrolyte. Since variable current drains can in cumulatively instances be expected, a unit must be capable of handling various amounts of internally generated heat. Further, it is important not only that the proper quantities of utilzes every be removed from the fuel battery, but ingenuity must also be exercised in the choice of locations and procedures through which heat is removed. For example, if heat is transferred from a fuel battery through the cathodes, these elements would be cooled below the temperature of the remaining elements and the probability of drowning the cathodes by excessive moisture accumulation thereon would be greatly increased. As a further illustration, if heat is withdrawn from a fuel battery in such a manner that a substantial temperature gradient is established from one edge to another the electrodes, the electrolyte may be robbed of moisture excessively over a portion of each cell area while a remaining portion of the same cell may suffer in performance from excessive moisture accumulation.

Both the thermal and reactant balances are, of course, related to the electrical output to be obtained from a fuel battery in use. In previously disclosed fuel batteries all of the component fuel cells have been identically constructed based upon the erroneous assumption that all such cells necessarily make an identical electrical contribution. While it is possible to meet any maximum load requirement merely by cumulatively associating fuel cells within a fuel battery stack until the requisite performance is obtained, this falls far short of an efficient fuel battery, that is a fuel battery which efficiently utilizes every fuel cell in the stack.

It is one object of our invention to provide a fuel battery which is capable of efficiently serving a multiplicity of disparate electrical requirements.

It is another object to provide a novel structural combination for maintenance of a desirable thermal relationship of elements within a fuel battery.

These and other objects of our invention may be accomplished by providing a fuel battery comprised of a plurality of electrode-electrolyte assemblies. Each of the assemblies consists of first and second electrodes and electrolyte means for ionically communicating the electrodes. Means are provided for mounting the assemblies in series electrical interconnection to form a fuel battery stack. First terminal means are associated in electrically conductive relation with one electrode of one of the assemblies while second terminal means are associated in electrically conductive relation with one electrode of another of the assemblies. The second terminal means is spaced from the first terminal means by at least two interposed electrolyte means. Third terminal means are electrically connected to the stack between and spaced from each of the first and second terminal means by at least one interposed electrolyte means, so as to lie at a potential intermediate that of the first and second terminal means. Means are provided to permit delivery of a first reactant sequentially first to the first electrodes lying within the range of potentials defined by the first and third terminal means and, subsequently, to the electrodes lying within the range of potentials defined by the second and third terminal means. Means are also provided to permit delivery of a second reactant to the second electrodes of the assemblies.

According to another aspect of our invention a fuel battery is provided which is adapted for mounting in surface abutment with a thermally conductive element. The fuel battery is comprised of a housing including at least one thin deformable, thermally conductive wall capable of intimately conforming to the contour of a surface of the thermally conductive element. A plurality of electrode-electrolyte assemblies lie within the housing each consisting of first and second spaced electrodes and electrolyte means for ionically communicating the electrodes. Means are provided to permit delivery of a first reactant to the first electrodes, and means are provided to permit delivery of a second reactant to the second electrodes. The second reactant delivery means is thermally conductive and lies in edge abutment with the thermally conductive wall. Heat conductor means is associated in thermally conductive relation with the second reactant delivery means for minimizing thermal gradients thereacross while accelerating heat transfer from the electrode-electrolyte assemblies to the deformable wall.

Figure 2:
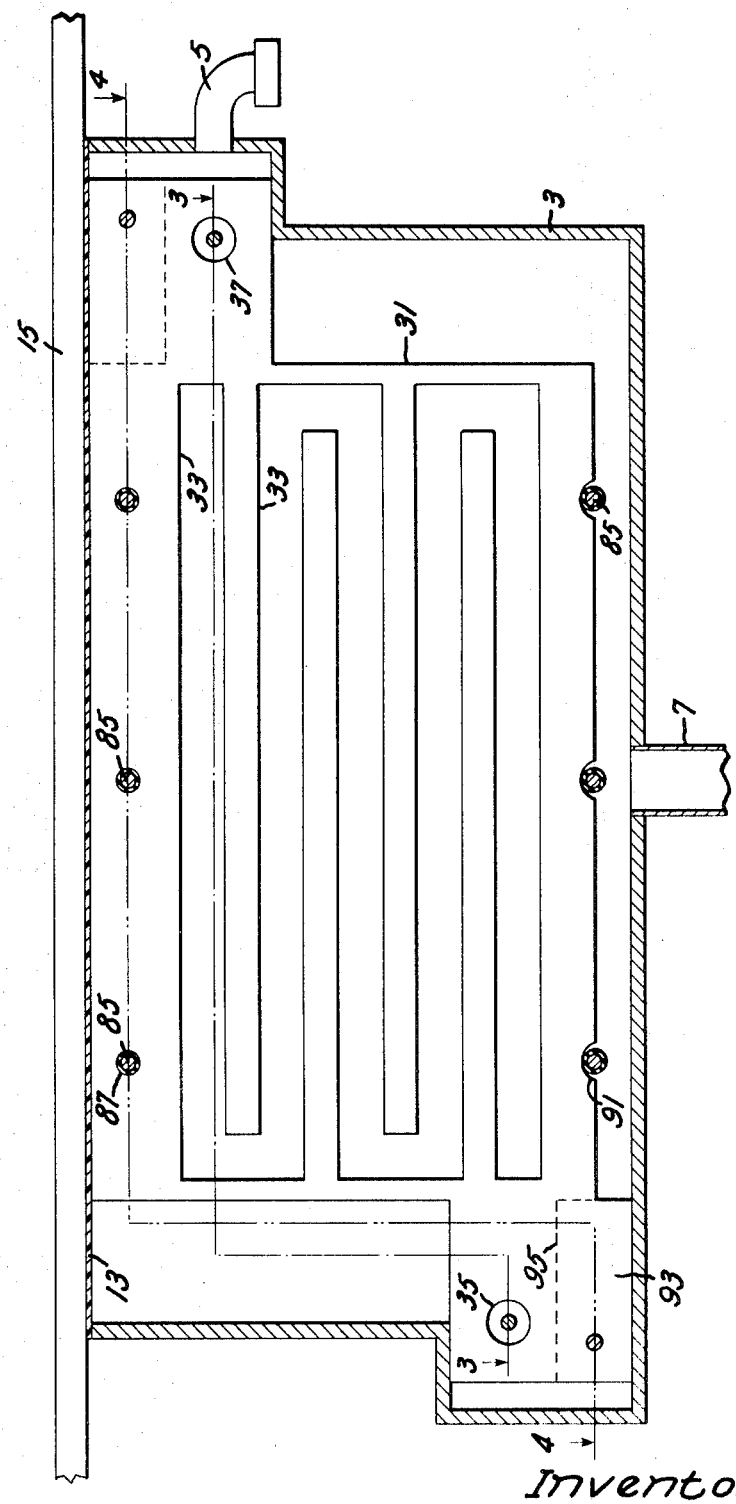
Figure 3:
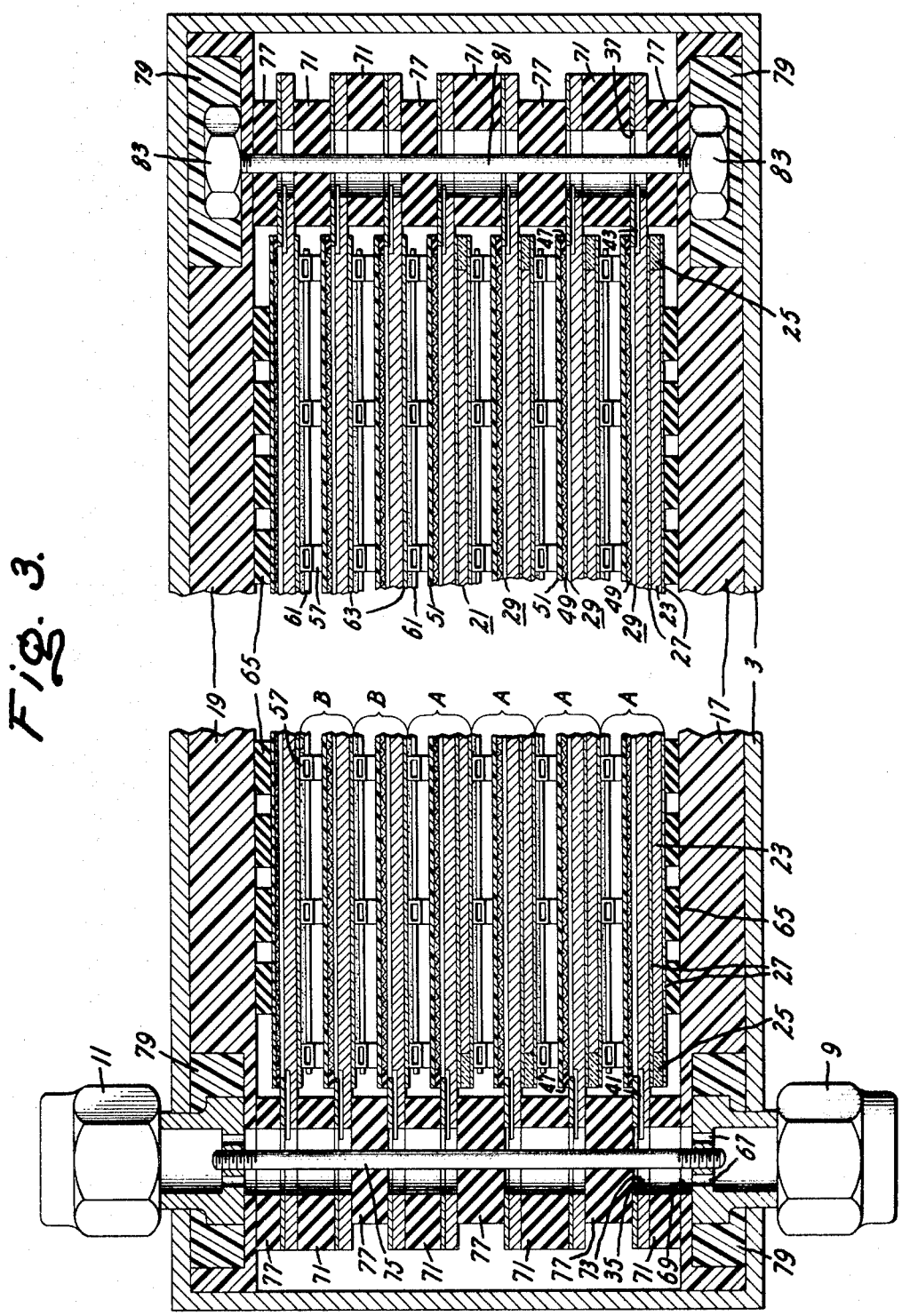
Figure 4:
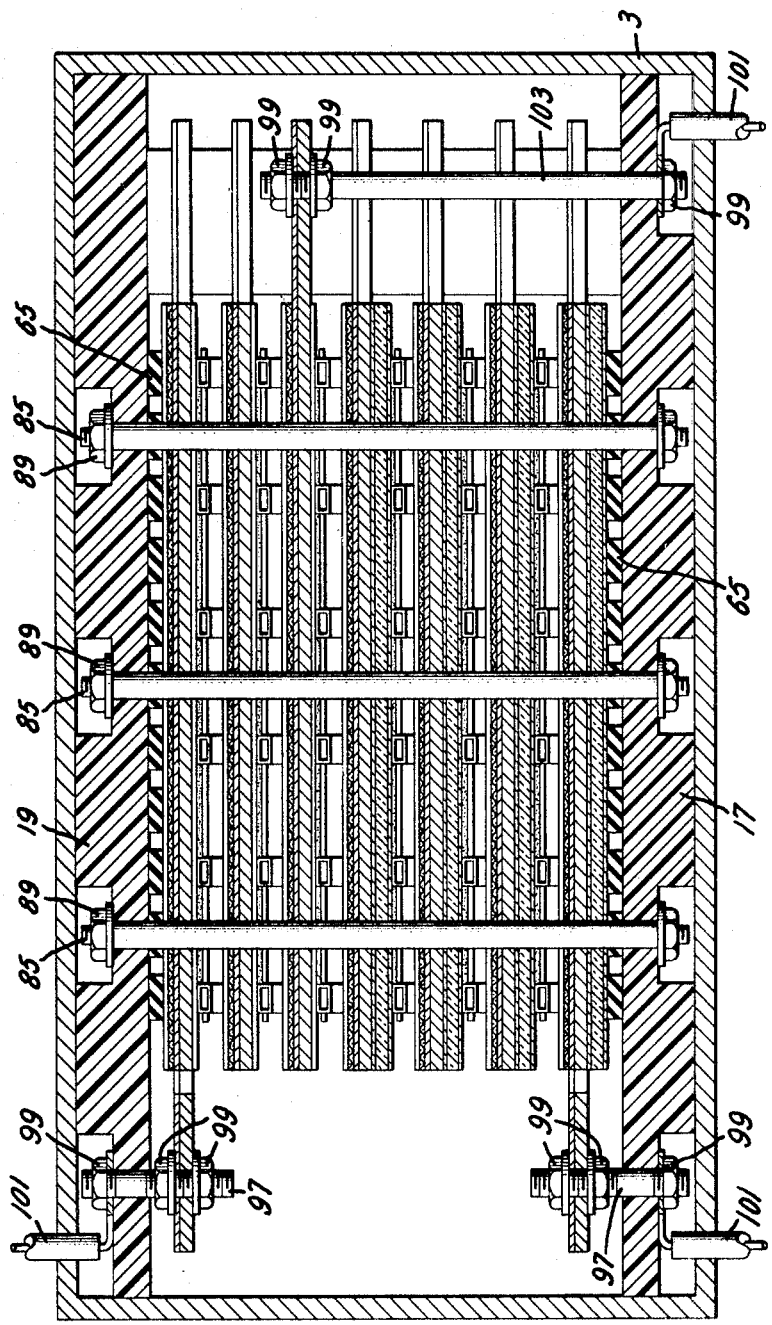

As an additional matter, our invention is also directed to a subcombination comprised of an electrode-electrolyte assembly consisting of first and second spaced electrodes and electrolyte means ionically communicating the electrodes. A thermally conductive reactant distributor contacts one of the electrodes. Means for withdrawing heat from and improving the uniformity of heat distribution within the electrode-electrolyte assembly contacts the reactant distributor over a major portion of the surface area thereof. This means is comprised of a core element of high thermal conductivity and means forming a thermally conductive, corrosion-resistant sheath encasing the core element. Our invention may be better understood by reference to the following detailed description considered in conjunction with the drawings, in which FIG. 1 is a perspective view with portions broken away, of a fuel battery constructed according to our invention, FIG. 2 is a vertical section of our fuel battery, FIG. 3 is a sectional view taken along line 3—3 in FIG. 2, and FIG. 4 is a sectional view taken along line 4—4 in FIG. 2.

As a preferred, specific embodiment, the fuel battery 1 is comprised of a housing 3 which confines a fluid reactant supplied through an inlet conduit 5. Reaction products formed by the fuel battery as well as a portion of the fluid reactant may be withdrawn form the housing through an outlet conduit 7. An inlet flow connector 9 and an outlet flow connector 11 pass through the housing for circulation of another fluid reactant within the fuel battery, as hereinafter described. The housing, with the exception of the upper wall 13, may be formed of any convenient construction materials sealingly united to the conduits and connectors according to any conventional technique.

The upper wall is formed of a thin deformable sheet of thermally conductive material which is edge sealed to the remaining portion of the housing. As shown in FIG. 2, the wall is intended to intimately conform to the surface of a thermally conductive element 15, which forms no part of the fuel battery. The thermally conductive element may, for example, form a part of a compartment which contains the housing. The housing is mounted with the upper wall in abutment with the thermally conductive element. Conventional mounting means, not illustrated, may be employed for this purpose. In the specific embodiment illustrated the wall is formed of an electrically insulative material, although the wall could as well be formed of an electrically conductive material having a thin electrically insulative coating. Exemplary of suitable electrically insulative materials which may be employed are natural and synthetic resins and rubbers. Also, these materials may be used as insulative coatings over soft malleable metals, such as tin, lead, gold, etc. It is not necessary that the upper wall have a high degree of plasticity, however. Relatively rigid elements may be used which nevertheless exhibit the capability of deformation under load, referred to as cold flow. Polytetrafluoroethylene is exemplary of a preferred synthetic resin capable of cold flow under load.

Mounted within the housing is a fuel battery stack comprised of end plates 17 and 19 and the elements sandwiched therebetween. The stack is comprised of two separate repeating sequences of elements, designated element groups A and B. Each group A is comprised of a heat conductor assembly 21. As shown, the assembly 21 consists of a core element 23 of high thermal conductivity encased in a sheath formed of a gasket 25 having sheets 27 formed of thermally conductive, corrosion resistant material bonded thereto. The core element is formed of material having a higher thermal conductivity but lower corrosion resistance than the sheets. For example, if the core element were formed of copper, the sheath may be formed of nickel, titanium-palladium alloy, etc. Copper, of course, exhibits superior thermal conductivity, but the latter materials exhibit superior corrosion resistance in a fuel cell environment. For purposes of illustration the gasket is shown formed of epoxy glass. In actual practice it may be formed of any material, electrically or thermally conductive or insulative, which is resistant to corrosion in the environment of use.

Lying adjacent each assembly 21 in thermally conductive relation therewith is a reactant distribution assembly 29. The assembly consists of a reactant flow director 31, best illustrated in FIG. 2. The director is formed to define a continuous, serpentine flow channel 33. One end of the channel is spaced from an aperture 35 while another end of the channel is spaced from an aperture 37. A backing plate 39 overlies the director on one face. As shown in FIG. 3, the backing plate is provided with grooves 41 and 43 connecting the apertures 35 and 37, respectively, with the ends of the flow channel. Adjacent the opposite face of the flow director is a distributor screen 45. The edge of the screen is suitably sealed against fluid leakage as indicated at 47. A salient feature of our invention is the edge abutment of the assemblies 21 with the upper wall 13 of the housing.

Adjacent the reactant distributor screen is an electrode-electrolyte assembly 49. This assembly consists of an electrolyte element 51, which in the form illustrated may be an ion exchange membrane or electrolyte immobilizing matrix. Adjacent opposite faces of the electrolyte element electrodes 53 and 55 are mounted. The electrodes may be of any conventional construction and may incorporate a current collector. Due to their slight thickness, the electrodes are not separately visible in FIGS. 3 and 4, but may be clearly viewed in FIG. 1.

Tubular spacers 57 hold the electrode 55 of each group spaced from the assembly 21 of the next adjacent group. Mounted by the near surface of the adjacent assembly 21 are a plurality of wicks 59. The wicks may be formed of any material capable of holding moisture by capillary action. The wicks may be held in position by adhesive bonding to the surface of the assembly. As shown in the drawings, horizontal retainers 61 are provided for this purpose.

Element groups A and B are otherwise identical, except that the B groups utilize a single element 63 in place of a heat conductor assembly 21. In addition to the end plates and repeating groups A and B, the stack includes an extra reactant distribution assembly and electrode-electrolyte assembly. The function of these additional elements is merely to transmit compressive force from the end plates to the elements in adjacent group B. These elements could readily be replaced by a single plate to perform their function. The only reason for including these elements is to avoid the necessity of manufacturing an additional element for the fuel battery. If desired, the terminal electrode-electrolyte assembly may be omitted. In such instance the grooves 41 and 43 would, of course, be plugged to avoid mixing of reactants. A plurality of flexible compression equalizing strips 65 are mounted interiorly adjacent the end plates.

At diagonally opposite corners of the stack provision is made for the circulation of a fluid reactant in series through the reactant distribution assembly of each group. For this purpose inlet flow connector 9 is provided with a plurality of ports 67 communicating with a port 69 in the end plate 17. An annular gasket 71 is sealingly interposed between the end plates and the backing plate of the first group A. The backing plate is provided with an aperture 73 in alignment with aperture 35 in the flow director. The interior of the gasket 71 is spaced from a tie rod 75 threaded to flow connectors 9 and 11. Accordingly, a flow passage is established from the exterior of the fuel battery, through the inlet flow connector and the gasket 71 to the first reactant distribution assembly. Flow past the first flow distribution assembly in the stack is prevented by a gasket 77 sealingly engaging the tie rod between the first and second reactant distribution assemblies. In FIG. 3 additional gaskets similar to gasket 71 are disposed between the second and third, fourth and fifth, and sixth and seventh reactant distribution assemblies. A final gasket 71 is interposed between the seventh flow distribution assembly and the end plate 19. Additional gaskets similar to gasket 77 are interposed between the third and fourth as well as the fifth and sixth reactant distribution assemblies. The flow connectors are sealed to the end plates by use of potting material 79.

At the opposite diagonal corner of the stack, tie bolt 81 cooperates with nuts 83 to place the stack in compression. Additional potting material 79 is used to seal the nuts to the end plates. At this end of the stack the relative positions of the gaskets 71 and 77 are reversed.

The tie bolts 75 and 81 function primarily only to compress the gaskets at the opposite diagonal corners. To provide compression uniformly within the stack insulatively coated tie rods 85 are provided along the upper edge of the stack. These tie rods pass through apertures 87 in the heat conductor assemblies. Note that the apertures penetrate the gaskets 25 thereof, so that the core elements remain protected from corrosion. The tie rods pass through the upper portion of the reactant distribution assemblies, over the upper edge of the electrode-electrolyte assemblies, and into the end plates where they are held by nuts 89. Three lower insulatively coated tie rods 85 similarly compress the lower edge of the stack. Although not visible, these rods similarly extend into the end plates. The lower tie rods do not pass through any of the assemblies of the stack, but each of the assemblies are notched as indicated at 91 to rest on the tie rods in the desired assembled relationship.

FIGS. 2 and 4 considered together best illustrate the arrangement through which electricity is withdrawn from the fuel battery. Electrical terminals are for convenience connected to the edges of the reactant distribution assemblies 29. Noting FIG. 2, the flow distributor 31 is shown in the lower left-hand corner to be provided with a tab 93 demarcated by a dashed line 95. A similar tab was originally provided on the upper right-hand corner of the distributor, but since no electrical connection was desired on this corner of the distributor, the tab was cut away prior to assembly of the stack. The backing plates are shown to be provided with tabs similarly as the flow distributors, but this is recognized as optional. Noting FIG. 4, the assembly 29 adjacent the end plate 17 is provided with a lower tab while the upper tab is removed. The assembly adjacent the end plate 19 is identical. Counting from the end plate 17, the second, third, and fourth as well as the sixth assemblies 29 have had the tabs removed from both corners. The fifth assembly 29 has had the lower tab cut away but has retained the upper tab. A first electrical terminal connecting with the assembly 29 next adjacent end plate 17 is formed by a bolt 97 and nuts 99. An electrical load may be connected to the terminal as indicated by a lead 101 thereof. A second terminal constructed identically as the first terminal connects to the first assembly 29 adjacent end plate 19. A third terminal identical to the first and third terminals, except for the substitution of a longer bolt 103 for bolt 97 provides an electrical connection to the fifth assembly 29, counting from end plate 17.

It is considered unnecessary to engage in any detailed description of the steps of manufacture or assembly of the fuel battery described, since we make no claim to patentable improvements in the manufacturing or assembling processes. Once the elements of the fuel battery have been fully described it would be a simple matter for those competent in the manufacturing arts to form and assemble the elements.

The fuel battery 1 described above as a preferred specific embodiment was built to serve a particular electrical application requiring the supply of relatively high potential and low current to charge a conventional secondary battery. This load, connected across the first and second terminals, made a low power demand on the fuel battery. The fuel battery was built to simultaneously deliver greater power to a lower potential, higher current load. This load was connected between the first and third terminals.

In a specific use, hydrogen was supplied to the inlet flow connector 9 while oxygen was allowed to enter the housing 1 of the fuel battery by diffusion, the fuel battery being mounted in a compartment having an oxygen atmosphere. The thermally conductive element 15 served as an exterior wall of the compartment.

Noting FIG. 3, the hydrogen circulated to the fuel battery passed through ports 67 in the flow connector 9, through gasket 71, and into the aperture 73 of the reactant distribution assembly 29 lying next adjacent end plate 17. Flow past this assembly 29 was prevented by a gasket 77 so that the hydrogen flowed through groove 41 into one end of the serpentine flow channel 33. The main flow of hydrogen was through the channel 33. However, hydrogen also diffused beneath the flow distributor 31 into the screen 45 overlying the electrode 53. This permitted the entire surface area of the electrode to participate in the electrochemical oxidation reaction. The edge seal 47 on the screen prevented any leakage of hydrogen. The hydrogen not consumed in the first assembly 29 was passed through groove 43 to the aperture in the diagonally opposite corner of the assembly. The hydrogen then flowed through a gasket 71 to the second assembly 29. The hydrogen flowed through the second assembly in like manner as the first assembly, except that the direction of flow was reversed. Hydrogen was circulated serially to each of the remaining assemblies 29, except the assembly 29 next adjacent the end plate 19. Since no hydrogen was consumed within this assembly, once the assembly was filled with hydrogen no additional hydrogen entered. A very small amount of hydrogen was continuously drained from the fuel battery through the outlet flow connector 11.

Simultaneously with the supply of hydrogen, oxygen diffused into the housing of the fuel battery through inlet conduit 5. The spacers 57 permitted oxygen to diffuse into contact with the oxygen electrodes 55 of the electrode-electrolyte assemblies 49. Unlike the hydrogen, oxygen was not serially delivered to the various electrodes, but was more or less equally available to all.

The electolyte elements 51 employed were cation exchange membranes. Accordingly, water was formed as a reaction product on the oxygen side of the electrode-electrolyte assemblies. Water droplets accumulating on the surface of the oxygen electrodes 55 were drawn by capillary action into the wicks 59 when they grew to sufficient size to bridge the gap therebetween. The wicks became saturated with water and thereby prevented drying the membranes by the oxygen by maintaining the humidity of the oxygen at the dewpoint. Once saturated, excess moisture dripped from the wicks and flowed from the fuel battery housing through outlet conduit 7.

Each of the elements making up the stack between the compression-equalizing strips 65 adjacent each end plate were formed of electrically conductive material, except the gaskets 71 and 77 and the wicks, which were formed of electrically insulative materials. Of the electrically conductive elements all were electrically electrically conductive, except the electrolyte elements, which were ionically electrically conductive. Thus, the first and second terminals of the fuel battery were joined by an electrical series connection of the cells making up the fuel battery.

A series-type fuel battery requires good face-to-face electrical contact of adjacent elements in order to avoid excessive power losses attributable to excessive internal resistance. It has been recognized that uniform compression of a fuel battery stack is a desirable objective in order to minimize internal resistance losses. A number of approaches have been undertaken to achieve uniform compression, including carefully machining each element within close tolerances so that no gaps exist between adjacent elements. The disadvantage of this approach is the high cost of manufacturing elements to such tolerances. Another approach has been to use massive end plates and large tie bolts so that a large compressive force may be placed on the stack. Contact irregularities are in effect pressed out of the plate. This approach suffers the disadvantage of introducing excessive weight into the fuel battery construction. In our illustrated fuel battery the compression-equalizing strips serve the function of distributing the compressive force equally across the surface of the stack. This eliminates the necessity of either machining to close tolerances or of using heavy end plates and tie bolts, thereby introducing excessive weight. In fact, our fuel battery may use relatively flexible end plates. Where end plates are formed of flexible material the only structural modification over that illustrated would be to clamp the electrical leads 101 between two nuts 99 rather than compressing the leads between a single nut and an end plate as shown. In this regard it is also noted that although the connectors 9 and 11 and the nuts 83 are shown pressing against the end plates, these elements could as well press directly against the gaskets lying immediately inwardly of the end plates. Because of the flexible nature of the end plates the compression provided by these elements is not distributed laterally in the end plates to any appreciable extent.

When the fuel battery is connected to a high-power-requiring load across the first and third terminals and a low power load across the first and second terminals, it is apparent that the electrode-electrolyte assemblies lying within the repeating groups A contribute to the supply of power for both loads, while the assemblies lying within the repeating groups B contribute only to the power requirements of the smaller load. Accordingly, considerably more heat is formed within the assemblies of the A groups than in the B groups. In the B groups the heat transfer sheets 63 and assemblies 29 are effective to transfer through the top wall 13 of the fuel battery housing the small amount of heat to be dissipated. In the repeating group A, however, the considerably amount of heat to be dissipated requires a more efficient arrangement.

During operation of the fuel battery the reactant distribution assemblies 29 withdraw heat from the electrodes and electrolyte elements of the assemblies 49. Heat is generated substantially uniformly within the electrode-electrolyte assemblies and flows into through the screen 45, flow director 31, and the backing plate 39. The upper edge of both the flow director and backing plate is in abutment with the upper wall of the housing. Since the upper wall is formed of a thin deformable material, it presents only a small barrier to heat transfer even when manufactured from a material less thermally efficient in heat transfer than metal, such as plastic. The deformability of the wall insures that there are no gaps between the edge abutment of the elements 31 and 39 and the wall 15, which is to receive the heat transferred. Accordingly, heat is transferred through the upper wall normally through the thickness thereof. Since the wall is formed of a thin sheet, no substantial thermal barrier is presented by the upper wall. If, by contrast, the wall and the element 15 were both formed of rigid metal sheets, it would be necessary to machine both surfaces within close tolerances to avoid gaps therebetween and high resistance to heat flow.

Heat delivered by the electrode-electrolyte assemblies to the elements 31 and 39 of the reactant distribution does not travel to the edge contact with the upper wall entirely within this assembly. To allow for more efficient dissipation of heat as well as more uniform distribution thereof, the heat conductor assemblies 21 are provided. Heat flows from the backing plates 39 into the adjacent sheet 27 and into the core element 23. Since the core element is a much better thermal conductor than any of the other materials making up the assemblies 21 and 29, heat travels faster within the core element than within the backing plate or flow distributor. Accordingly, heat flows out of the assembly 29 into the core element over a substantial portion of the face contact between assemblies. Along the upper edge of the core element the direction of heat transfer is from the core element back to the backing plate and flow distributor. This is because the upper portions of these elements are selectively cooled by their edge abutment with the upper wall. The result then is that the core element provides a parallel lower resistance path for heat travel. It also functions to minimize any tendency toward a pronounced vertical thermal gradient across the assemblies 21 or 49. This is an important feature, since thermal gradients within the stack can cause selective drying or failure of excessively heated portions of the electrolyte element. Our arrangement assures efficient heat dissipation while maintaining uniformity of heat distribution.

A very important feature of our invention is the fact that hydrogen was circulated serially to the electrodes 53 of the fuel battery. If a reactant having a very low impurity level of inerts is circulated to a fuel cell, the selective consumption of the reactant in the cell will lead to a large increase in the relative proportion of inerts in the exhausted reactant. When a reactant is flowed in series through a plurality of fuel cells, it is our observation that the proportion of inerts may be so high in the last cell in the series that it is incapable of delivering a high power output. By circulating hydrogen first to the electrodes contributing to the high power output and then to the electrodes delivering the low power output, the disadvantages of increased inert proportions in the terminal cells is largely avoided. Since the fuel electrodes in the groups B are called upon for only a low power output, the possible accumulation of a high proportion of inerts is not materially detrimental. If the flow were reversed, the electrodes in the groups B would exhibit a power-generating capacity much greater than required, while at least some of the electrodes 53 in the groups A would be unable to generate their share of the total power requirement.

While we have described our invention with reference to a specific fuel battery, it is appreciated that numerous modifications may be readily introduced without departing from the teachings thereof. For example, assuming air is to be employed as one reactant to the fuel battery, it is not necessary to utilize the housing with the exception of the upper wall. We have described an operation of the fuel battery in which oxygen is supplied through the flow conduit 5 and hydrogen through the inlet flow connector 9. If an anion exchange membrane or an alkaline electrolyte element were substituted for the cation ion exchange membrane actually used, it would be desirable to reverse the relationship of these reactants. While one reactant is illustrated as being delivered to the electrodes serially and the other reactant delivered is delivered in what is in effect a parallel flow pattern, this is not necessary. While the serial flow relationship is essential to the achievement of some of the advantages of our invention, it is not essential to all advantages and may accordingly be replaced with a parallel flow relationship, if desired. Alternately, merely by rearranging the gaskets 71 and 77, one reactant may be first introduced in parallel to electrodes in the A groups and then introduced either serially or in parallel to the electrodes in the B groups. This parallel-series flow pattern would retain all of the advantages of the purely series flow pattern above described. Where more than one internal terminal is to be used, the fuel battery stack could be subdivided into a larger number of groups, each to be supplied with reactant according to the electrical demands to be placed thereon. If desired the structure of the fuel battery may be modified to provide for serial or parallel-series flow of both reactants rather than only one. This may be accomplished merely by placing a reactant distributor assembly adjacent both electrodes in place of the tubular spacers 57 and in using the lower right and upper left corners of the stack to interconnect these assemblies as is done in the upper right and lower left corners already. It is, of course, unnecessary that a serpentine flow channel extend over the surface of the screen. The flow distributor may form only an opening to confine reactant rather than a circulation guide. In such case the screen could also be omitted. This would, however, diminish the electrical efficiency of the stack for lack of a good electrical conductor in contact with the central portions of the electrodes. In certain applications it may be feasible to substitute for the heat conductor assemblies a single thermally conductive plate and vice versa.

Numerous additional modifications will readily occur to those skilled in the art. It is consequently our invention to define our invention as set out in the following claims.

What we claim as new and desire to secure by Letters Patent of the United States is:

1. A fuel battery comprising a plurality of electrode-electrolyte assemblies, each of said assemblies consisting of first and second spaced electrodes, and electrolyte means for ionically communicating said electrodes, means mounting said assemblies in series electrical interconnection to form a fuel battery stack, first terminal means associated in electrically conductive relation with one electrode of one of said assemblies, second terminal means associated in electrically conductive relation with one electrode of another of said assemblies and spaced from said first terminal means by at least two interposed series connected electrode-electrolyte means.

third terminal means electrically connected to an electrode of said stack between and spaced from each of said first and second terminal means by at least one interposed series-connected electrode-electrolyte means, so as to lie at a potential intermediate that of said first and second terminal means.

a first means adapted to connect a first load across said first and second terminals whereby all of the electrode-electrolyte assemblies supply electrical energy to the first load, a second means adapted to connect a second load across said first and third terminal means whereby the electrode-electrolyte assemblies between said first and third terminal means supply electrical energy to both the first and second loads, means permitting delivery of a first reactant sequentially, first to said first electrode-electrolyte assemblies lying within the range of potential defined by said first and third terminal means and subsequently, to said electrode-electrolyte assemblies lying within the range of potential defined by the second and third terminal means, whereby the first reactant flows first over the electrode-electrolyte assemblies contributing to both loads so that they are not affected by the accumulation of inerts in the first reactant stream in its serial passage through the assemblies, and means for permitting simultaneous delivery of a second reactant to said second electrodes of said assemblies.

2. A fuel battery according to claim 1 in which said first reactant-delivery-permitting means connects said first electrodes in a series flow pattern.

3. In combination with the fuel battery defined by claim 1
a first electrical load connected across said first and second terminals,
a second electrical load connected across said first and third terminals, and
said first electrical load requiring a high potential and a low current as compared to said second electrical load.

4. A fuel battery according to claim 1 adapted for mounting in surface abutment with a thermally conductive element including further
a housing having at least one thin, deformable thermally conductive wall capable of intimately conforming to the contour of the thermally conductive element,
said second reactant delivery means being thermally conductive and lying in edge abutment with said thermally conductive wall and,
heat conductor means associated in thermally conductive relation with said second reactant delivery means for minimizing thermal gradients thereacross while accelerating heat transfer from said electrode-electrolyte assemblies to said deformable wall.

5. The combination of a fuel battery as defined by claim 4 including a thermally conductive element in which said thermally conductive element forms an external wall of a compartment enclosing said fuel battery.

6. A fuel battery according to claim 4 in which said thin, deformable wall is formed of a plastic material capable of cold flow under load.